United States Patent [19]

Residois

[11] Patent Number: 4,728,952

[45] Date of Patent: Mar. 1, 1988

[54] RADAR ECHO DISCRIMINATING DEVICE

[75] Inventor: Michel Residois, Plouzane, France

[73] Assignee: Thomson-CSF, Paris, France

[21] Appl. No.: 684,463

[22] Filed: Dec. 21, 1984

[30] Foreign Application Priority Data

Dec. 23, 1983 [FR] France .............................. 83 20679

[51] Int. Cl.$^4$ .............................................. G01S 7/30
[52] U.S. Cl. ...................................... 342/26; 342/159
[58] Field of Search ............... 343/5 CE, 5 CF, 5 W, 343/5 VQ, 5 NQ, 5 FT, 7.7; 342/26, 159–162, 189, 195

[56] References Cited

U.S. PATENT DOCUMENTS

| 4,139,847 | 2/1979 | Shimzu et al. | 343/5 W |
| 4,318,100 | 3/1982 | Shimizu et al. | 343/5 W |
| 4,489,319 | 12/1984 | Hansen | 343/5 CF X |
| 4,513,286 | 4/1985 | Irabu | 343/5 CF |
| 4,533,915 | 8/1985 | Lucchi et al. | 343/5 W |
| 4,555,703 | 11/1985 | Cantrell | 343/5 VQ X |

OTHER PUBLICATIONS

Transactions of the National Conference of the Electronic Communication Academy, p. 6-205; (Tokyo, Japan; 1979).

M. Skolnik, Radar Handbook; (McGraw-Hill, 1970), pp. 35-16, 5-29 to 5-31.

Primary Examiner—Theodore M. Blum
Assistant Examiner—Bernarr Earl Gregory
Attorney, Agent, or Firm—Roland Plottel

[57] ABSTRACT

A radar echo discriminating device for separating in the video signal of a pulse-type meteorological radar the rain echoes from the echoes due to the ground comprises fluctuation calculating means for subtracting the amplitude of the incident video signal corresponding to a given pulse emitted by the radar from the amplitude of a stored video signal corresponding to a pulse previously emitted by the radar, whereby the signal obtained after this processing represents only the rain echoes, whereas the ground echoes are attenuated.

9 Claims, 6 Drawing Figures

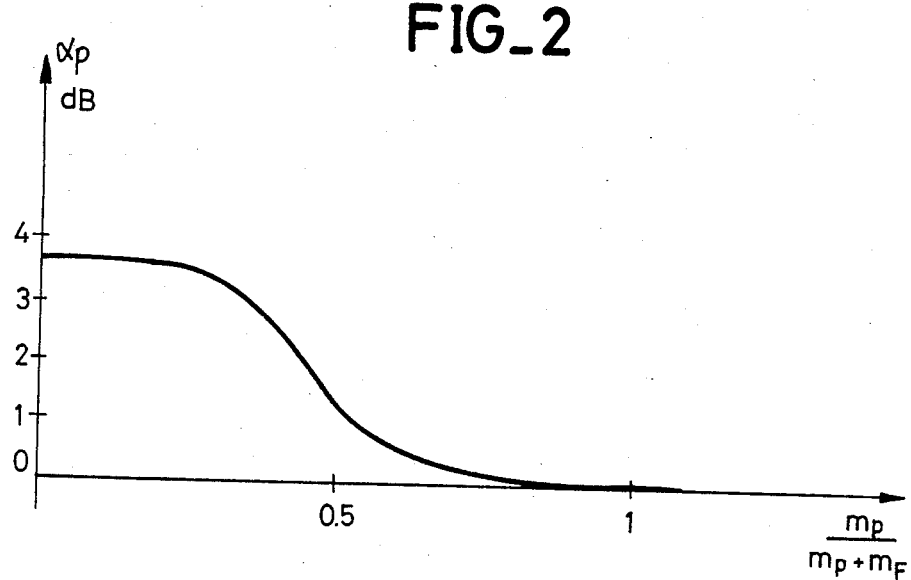
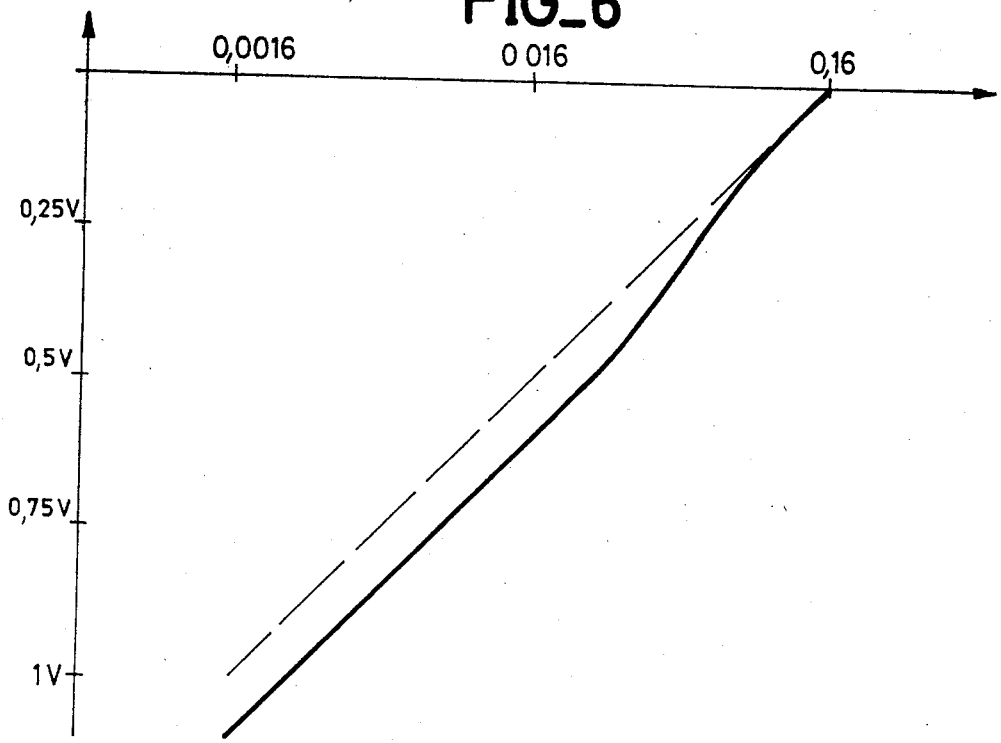

RADAR ECHO DISCRIMINATING DEVICE

BACKGROUND OF THE INVENTION

1. Field of the invention

The present invention is related to a device for discriminating radar echoes according to their nature, to wit: ground echo, rain echo, sea echo, moving target echo etc. More particularly, the invention concerns fixed-unit meteorological radar installations wherein the echoes generated by rain must be distinguished from those generated by the ground, while these latter have to be eliminated.

2. Description of the prior art

In the prior art rain echoes or thick cloud echoes have been separated from fixed or stationary echoes (or targets) either by the so-called "circular polarization" method or by the so-called "MTI" technique (MTI standing for "Moving Target Indicator") involving phase measurement, or again by applying hypotheses concerning the length or the uniformity of the cloud or rain echoes.

Among these techniques only the first one is efficient, the second one giving variable and uncomplete results as regards the precipitations, while the third one never has completely satisfied the users.

U.S. patent specifications Nos. 4,139,847 and 4,318,100 disclose another principle which is based on the fact that those parameters defining the radar echo variations that are treated as random phemonena—i.e. the amplitude distribution and the autocorrelation (or self-correlation) function—have quite different values, depending on the nature of the echoes, and more particularly based on the fact that the received power of a stationary echo exhibits less average variation, and varies more slowly, than the received power of a rain echo does.

It is an object of the present invention to provide a radar echo discrimination device which achieves better performances than those of the devices disclosed in the above-mentioned U.S. patent specifications.

SUMMARY OF THE INVENTION

With this object in view, the invention provides a radar echo discriminating device for separating in the video signal of a pulse-type meteorological radar the rain echoes from the echoes generated by the ground, comprising means for calculating fluctuations, adapted to subtract the amplitude of the incident video signal corresponding to a given pulse of the radar from the amplitude of the stored video signal corresponding to a pulse previously emitted by the radar, the signal obtained as a result of such processing representing only rain echoes while the ground echoes are strongly attenuated, wherein compensated conversion means are provided for converting into a logarithmic signal the linear signal obtained either at the output terminal of said fluctuation calculating means or at the output of the integrating means, depending on whether said fluctuation calculating means are used alone or in association with said integrating means, said device further comprising adding means for adding to the thus obtained signal the logarithmic video input signal of the radar echo discrimination device, which input signal is delayed by a lapse of time equal either to the time of processing through the fluctuation calculating means and the converting means, or through the fluctuation calculating, converting and integrating means, depending on whether said fluctuation calculating means are used alone or in association with said integrating means, whereby the signal thus obtained at the output terminal of said adding means represents said rain echoes.

It will be understood that this system evaluates the variance of the rain echoes. The ratio of variance to mean value, or of variance to mean square value being constant for this echo type the pluviometric measurements are not impaired.

BRIEF DESCRIPTION OF THE DRAWING

These and other objects and features of the present invention will become more clearly apparent from the following description of various embodiments, which is given with reference to the appended drawing and by way of illustration, but not of limitation.

In the drawing:

FIG. 2 shows a device representing the variation of a corrective term, due to the super-imposition of a stationary echo and a rain echo;

FIG. 6 is a diagram representing the transfer function of a circuit according to FIG. 5.

In the figures similar elements are designated by respectively identical reference signs and/or numerals.

DESCRIPTION OF PREFERRED EMBODIMENTS

Figure 1:
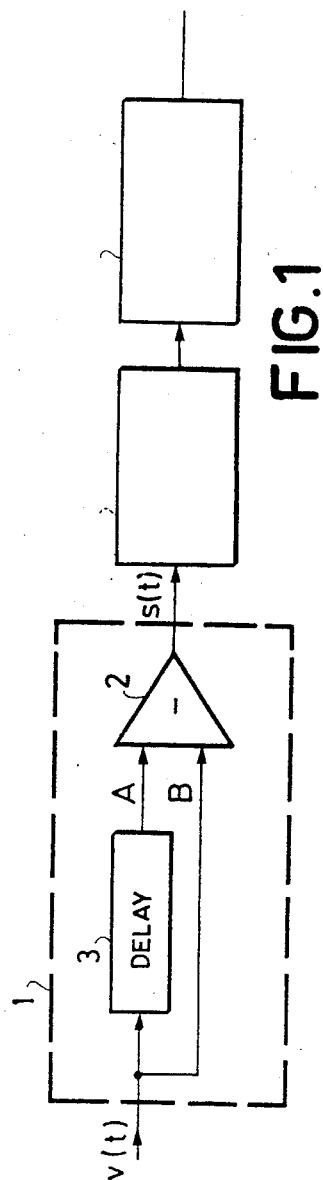
FIG. 1 schematically illustrates the principle of the device according to the invention.

The discriminating device shown in FIG. 1 comprises fluctuation calculating means 1 for subtracting the amplitude B of an incident video signal v(t) corresponding to a given pulse emitted by a radar from the amplitude A of a stored video signal corresponding to a pulse previously emitted by the radar. Said fluctuation calculating means comprise a subtractor 2 which receives, on the one hand, the incident video signal v(t) and, on the other hand, the video signal v(t) retarded by a delay device 3. The delay $\tau_1$ produced by delay device 3 can be equal to the repetition period T of the pulse radar, or to a multiple thereof. It should be noted that, since the rotational speed of the emitting antenna of a meteorological radar is very low (ranging about 2°/sec), it may be considered that amplitudes A and B are related to one and the same elementary point located in the direction concerned the remote discrimination power of the radar between two elementary points being equal to the pulse duration $\tau$).

The amplitude difference A-B obtained at the termination of the fluctuation calculation represents the fluctuating portion of the video signal and is the larger as the video signal fluctuates more rapidly with reference to the time interval between successive echoes processed in relation to a single common elementary point.

Since the evolution of the received power of a stationary echo is, on the average, less important and slower than that of the power of a rain echo, the echoes due to the ground are strongly attenuated in the difference signal A-B. The discrimination of rain echoes and ground-generated echoes can thus be based either upon simple observation of this difference signal, or upon more complex subsequent processing of said signal.

It is possible to associate to fluctuation calculating means 1 integrating means 4 allowing a mean value of the difference signal A-B to be calculated for a time period $\tau_2$. Integration time $\tau_2$ allows the efficient (or mean) value of the amplitude to be evaluated. Such evaluation is the more accurate as time period $\tau_2$ is longer. Time period $\tau_2$ is then a compromise between this condition and the maximum scanning time of the antenna wave beam for an elementary point.

Means 5 for calculating the difference A-B are provided at the output terminal of fluctuation calculating means 1.

Figure 3:
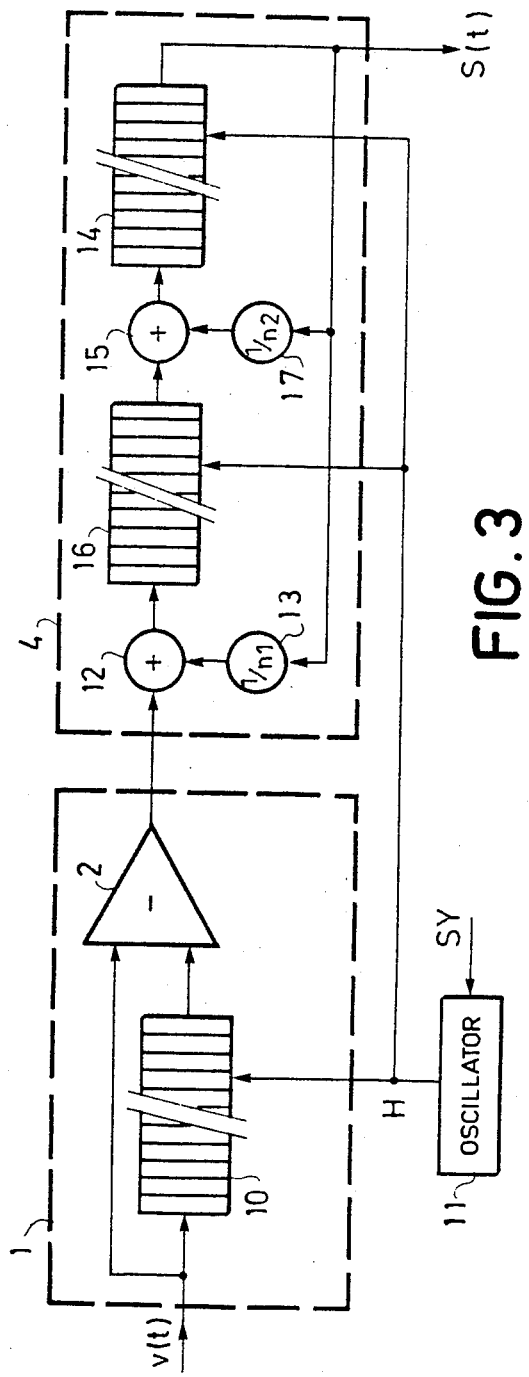
FIG. 3 shows a first embodiment of a variance evaluating device with a linear video amplification chain and means for analog processing of the signal.

The embodiment shown in FIG. 3 comprises a linear video amplification analog-processing circuit.

Delay device 3 which is part of the fluctuation calculating means is implemented on the base of a load transfer register 10 particularly adapted to provide a delay line. The number of elementary cells of this load transfer register is at least equal to the possible number of elementary points during time period $\tau_1$. The elementary point frequency being equal to $1/\tau$, the load transfer register is activated by a clock signal H having a frequency of $2/\tau$. Clock signal H is supplied by an oscillator 11 which is controlled by a radar synchronization signal SY defining zero distance. Register 10 may be a CCD.

Integrating means 4 are implemented, for example, by means of a recursive digital filter comprising a first adder 12 which receives, on the one hand, the output signal of the fluctuation calculating means and, on the other hand, a signal supplied by a multiplier 13 multiplying by $1/n_1$. The input terminal of multiplier 13 is connected to the output terminal of a delay line that is advantageously constituted by a load transfer register 14 the input terminal of which is connected, in turn, to the output terminal of an adder 15. Adder 15 receivers, on the one hand, the output signal of a relay line constituted advantageously by a load transfer register 16 the input terminal of which is connected, in turn, to the output terminal of adder 12 and, on the other hand, the output signal of a multiplier 17 multiplying by a coefficient $1/n_2$, which has its input terminal connected to the output terminal of load transfer register 14. Load transfer registers 14 and 16 receive the same clock signal H as load transfer register 10, and the number of their elementary cells meets the same conditions.

Figure 4:
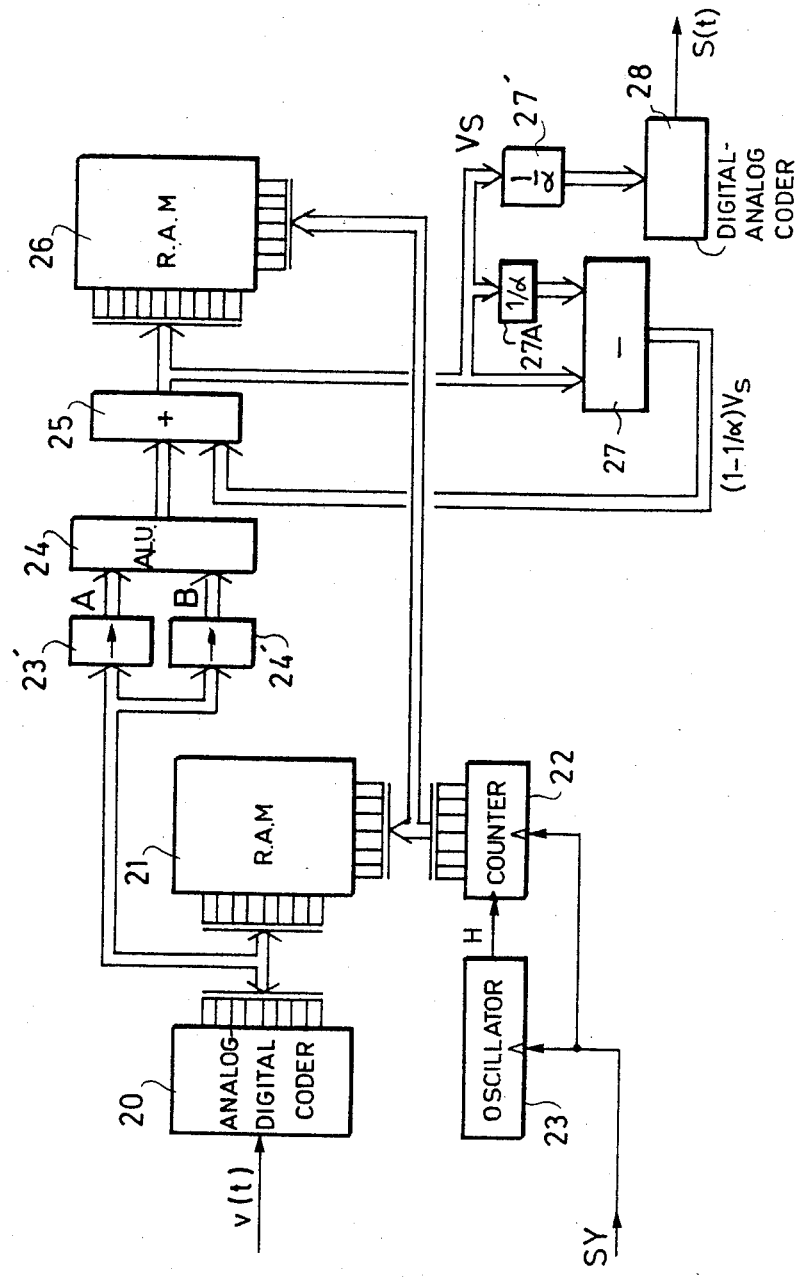
FIG. 4 shows a second embodiment of the variance evaluating device according to the invention, comprising a linear video amplification chain and means for digital processing of the signal.

It is possible, on the base of the same principle, to perform digital processing applied to a linear video amplification chain. This solution will now be described with reference to FIG. 4.

Here video signal v(t) is coded in an analog-digital coder 20 having a sampling frequency of at least $2/\tau$. The successive binary terms issuing from coder 20, which represent the amplitude of the samples, are processed either by means of a sequential circuit, or by a micro-programmed machine, on the base of the following organigram:

coding, by analog-digital coder 20, the sample collected from signal v(t) at instant t, reading, at a certain address A of a live RAM 21, the sample which has been collected at instant $t-\tau_1$ from the video signal and has been coded and stored in said memory, addressing to said address A of memory 21 the coded sample collected at instant t (memory 21 being sequentially addressed by a counter 22 which is incremented by the above-defined signal H supplied by an oscillator 23, said counter being "zeroed" (reset to zero) by the above-defined radar synchronization signal SY), calculating by means of an arithmetic and logic unit 24 the absolute value of the difference between the respective amplitudes of the coded samples collected at instants t and $t-\tau$, respectively, these amplitudes being rectified by rectifiers 23' and 24', introducing this difference in the algorithm of the calculation of the mean value for time period $\tau_2$, said calculation being performed, by example, by means of an adder 25 associated to a random access memory 26 which is addressed by counter 22 and wherein the results supplied by adder 25 are stored, the latter receiving, on the one hand, the data supplied by arithmetic and logic unit 24 and, on the other hand, the data supplied by a subtractor 27, which latter receives, on the one hand, the output signal of adder 25 and, on the other hand, this same signal multiplied by a coefficient $1/\alpha$ (multiplier 27A), obtaining the digital value of the mean level at the point considered, after multiplying the value obtained at the output terminal of memory 26 by the coefficient $1/\alpha$ by means of multiplier 27', converting (digital-analog) this value by means of a digital-analog converter 28.

The size of memories 21 and 26 meets the same conditions as those set forth herein above in relation to the load transfer registers of FIG. 3.

With this device, superimposing a stationary echo and a rain echo results in an erroneous evaluation of the rain echo. This error a variation curve of which is shown in FIG. 2 may bring about undesirable effects. The device according to the invention as described hereinbelow allows not only to attain easily the object of said invention but also to correct easily this error and thus to reach a correct evaluation of the "clutter" level.

Figure 5:
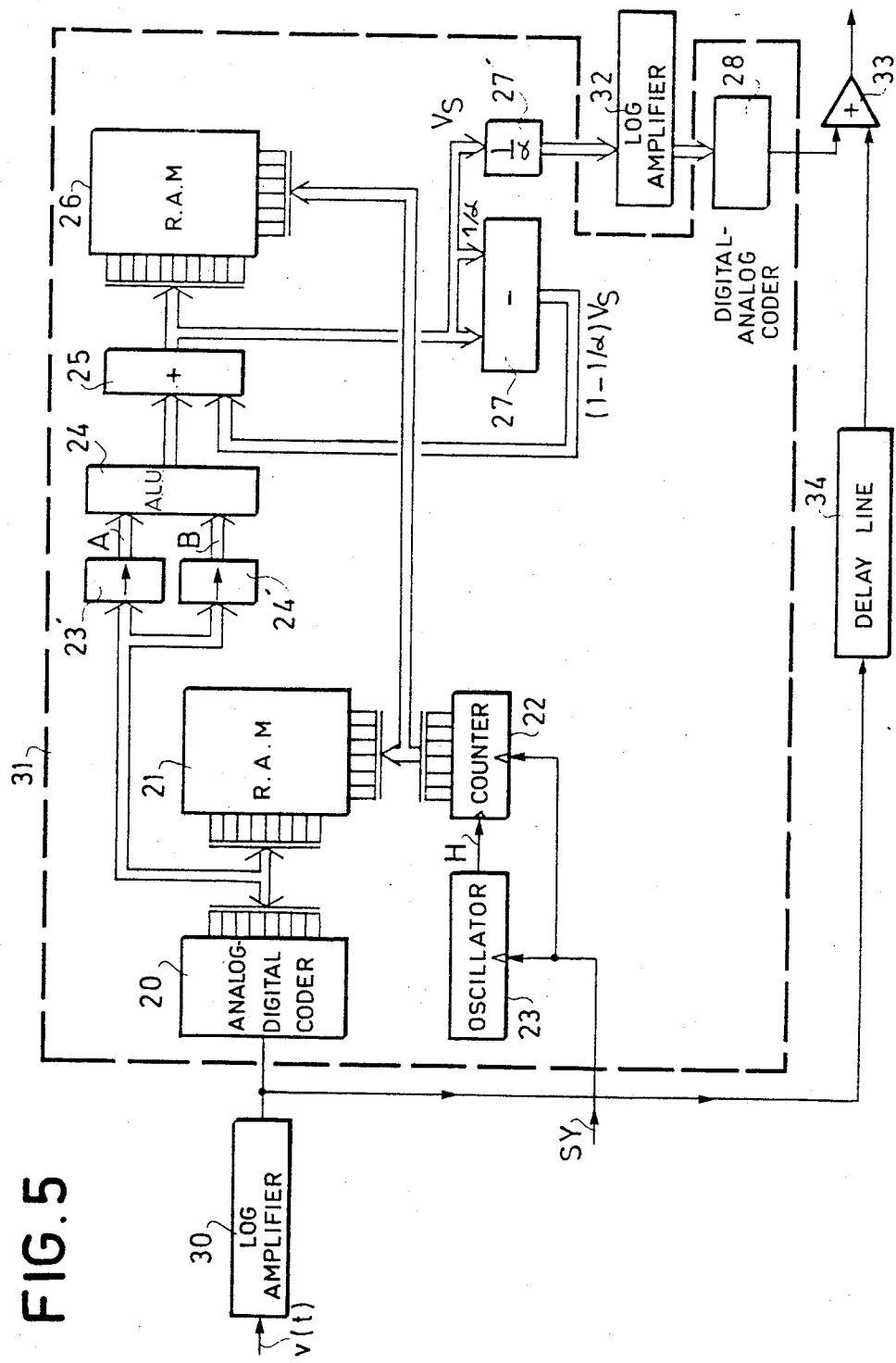
FIG. 5 represents a preferred embodiment of the invention, including a logarithmic video amplification chain and means for digital processing of the signal.

FIG. 5 shows a digital type embodiment of the invention, associated to a logarithmic video amplification chain, for performing a relative variance evaluation.

In the first place the modifications to be made to the device with respect to the preceding cases corresponding to a linear video amplification chain will be described.

In the case of a logarithmic video chain the input signal of the discriminating device is expressed in the form of K log v(t), this signal being obtained from the linear video signal v(t) through a logarithmic input amplifier 30.

An echo being defined by its mean value m and its standard deviation $\sigma$, it is supposed that the input terminal of logarithmic input amplifier 30 receives a stationary echo having a mean value $m_F$ and a standard deviation $\sigma_F$, superimposed to a rain echo having a mean value $m_p$ and a standard deviation $\sigma_p$.

At the input terminal of the logarithmic input amplifier the following mean value and variance value are obtained, respectively:

$$m_1 = m_F + m_p$$

and $$\sigma_1^2 = \sigma_F^2 + \sigma_p^2 \cdot \alpha_p^2$$

while at the output terminal of the logarithmic input amplifier, assimilating the logarithmic function with its derivative about the signal mean value, are obtained:

$$m_2 = K \log(m_F + m_p)$$

and $$\sigma_2{}^2 = \frac{k^2(\sigma_F{}^2 + a_p{}^2 \cdot \sigma_p{}^2)}{(m_F + m_p)^2}$$

(with k=K/2, 3).

At the output terminal of a discriminating device 31 identical with the one described herein-before in relation to linear video amplification means, the following will be obtained:

$$m_3 = 0$$

and $$\sigma_3 = \frac{\sqrt{2} \, k\sigma_p \cdot a_p}{m_F + m_p}$$

neglecting the residual stationary echo term.

This device 31 being followed by a logarithmic input amplifier 32 similar to logarithmic input amplifier 30 with compensation by the correction term K log $a_p$, the following expression is obtained:

$$K \log \sigma_3 - K \log a_p$$

thus $$K \log \sqrt{2} + K \log k + K \log \sigma_p = K \log (m_F + m_p)$$

In fact, as shown in FIG. 5, amplifier 32 is of the digital type and consequently is interposed between elements 27 and 28. In this case amplifier 32 is constructed by means of a programmed ROM in a manner known per se, so as to provide to mathematical functions of logarithm, as well as $a_p$ compensation and correction of constants. The transfer curve of such an amplifier has then the shape shown in FIG. 6. In this figure the abscissae represent the input values $\sigma_3$, and the ordinates represent the output values $V_S$. The curve in dashed line would correspond to a logarithmic amplifier having a slope of 40 dB/Volt without compensation, while the full line curve would correspond to amplifier 32 compensated by the term K log $a_p$, as indicated hereinabove. On this curve in full line the point zero of the ordinates corresponds to a rain echo alone (without any stationary echo).

It can be seen that in this expression, value $K \log \sqrt{2} = K \log k$ is a constant value, value $K \log \sigma_p$ which characterizes the rain echo corresponds to the useful signal which it is desired to obtain at the output terminal of the discriminating device (the ratio of the mean value $m_p$ to the standard deviation being in fact substantially constant for a rain echo, whichever the density of the cloud may be), and the value $K \log (m_F + m_p)$ corresponds to the mean value $m_2$ available at the output terminal of logarithmic input amplifier 30.

Thus a radar echo discriminating device associated to a logarithmic video amplification chain may be obtained by starting from radar echo discriminating device 31 associated to a linear video amplification chain and logarithmic amplifier 32, and by disposing an adder 33 after the latter (or rather after element 28). Adder 33 allows to add to the value obtained at the output terminal of logarithmic amplifier 32 the signal available at the output terminal of logarithmic input amplifier 30 (which signal can be assimilated to its mean value, provided that the discriminating device is followed be processing means which allow to take into account only the mean value of the signals) which output signal is retarded through the unit formed by the radar echo discriminating device 31 associated to a linear video amplification chain and to logarithmic amplifier 32.

This solution leads to a practical construction at minimum cost, while other embodiments can, of course, also be envisaged.

Other applications of the invention can be envisaged, particularly application to sea echoes and to moving echoes.

Of course, when the entire video amplification chain is linear (analog or digital) the output terminal of either the fluctuation calculating means or the integrating means—depending on whether the latter are provided or not—will be followed by a device performing a correction similar to that which is ensured by amplifier 32 (so as to compensate the superimposition of the stationary echo and the rain echo), such correction being clearly deducible from FIG. 6, while the construction of such compensating device is obvious to those skilled in the art after studying the foregoing description.

The invention is not limited to the embodiments shown and described herein-above; many variants and modifications may be envisaged by those skilled in the art without departing from the spirit and scope of the invention as defined in the appended claims.

What is claimed is:

1. A radar echo discriminating device for use with pulse type meteorological radar and for discriminating between the echoes generated by rain and those echoes generated by the ground comprising:
    (a) fluctuation calculating means for receiving a wideband radar echo signal and for substracting an amplitude of said signal from an amplitude of a previously received radar signal and providing an output difference signal;
    (b) a compensating device connected for receiving said difference signal and amplifying said difference signal with a gain which compensates for said ground echo and the rain echo, and providing a compensated amplified difference signal; and
    (c) adding means having an input means to receive the wideband radar echo signal and the compensated amplified difference signal and for adding said signals, whereby a signal is provided at an output of said adding means which represents said rain echoes.

2. A device according to claim 1 further comprising integrating means between said fluctuation calculating means and said compensating device for calculating the mean values of several difference signals and applying said mean values to the compensating device.

3. A device according to claim 2 wherein said fluctuation calculating means comprises a delay line, and wherein said integrating means comprises a recursive digital filter including a first adder (12), an output terminal of which is connected through a first delay line (16) to a second adder (15), an output terminal of which is connected to a second delay line (14) which has its output terminal connected to a first multiplier (13) and a second multiplier (17), the output terminals of said multipliers being connected respectively to a first adder (12) and said second adder (15).

4. A device according to claim 3 wherein said delay lines are charge coupled devices.

5. A device according to claim 4 which is preceded by a logarithmic amplifying chain (30), and wherein said compensating device comprises a logarithmic amplifier.

6. A device according to claim 5 wherein said logarithmic amplifier of said compensating device comprises a ROM (32).

7. A device according to claim 2 in which the fluctuation calculating means comprises a analog-digital coder (20) connected to a first RAM (21) and to two rectifiers (23' and 24') which are connected to an arithmetic and logic unit (24) connected to said integrating means, said integrating means comprising an adder (25), the output of which is connected to a second RAM (26) and to a subtractor (27) and also through a coefficient multiplier (27a) to said subtractor, and an output of said second RAM (26) being connected through a coefficient multiplier (27') to a digital-analog coder (28).

8. A device according to claim 1 which is preceded by a logarithmic amplification chain and wherein said compensating device comprises a logarithmic amplifier.

9. A radar echo discriminating device according to claim 1 further comprising delay means for delaying said wideband radar echo signal applied to said adding means by a time period equal to the time of processing through said fluctuation calculating means and said compensating means.

* * * * *